United States Patent
Horibe et al.

(10) Patent No.: US 8,480,121 B2
(45) Date of Patent: Jul. 9, 2013

(54) AUTOMOBILE AIRBAG DOOR

(75) Inventors: Hitoshi Horibe, Kiyosu (JP); Minoru Shibata, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 15 days.

(21) Appl. No.: 13/347,006

(22) Filed: Jan. 10, 2012

(65) Prior Publication Data

US 2012/0217729 A1      Aug. 30, 2012

(30) Foreign Application Priority Data

Feb. 25, 2011      (JP) ................................. 2011-040176

(51) Int. Cl.
*B60R 21/205* (2011.01)
*B60R 21/215* (2011.01)

(52) U.S. Cl.
USPC ....................................... 280/728.3; 280/732

(58) Field of Classification Search
CPC .. B60R 21/215; B60R 21/2155; B60R 21/2165
USPC ............................................. 280/728.3, 732
See application file for complete search history.

(56) References Cited

U.S. PATENT DOCUMENTS

| 7,798,518 | B2* | 9/2010 | Kornylo et al. | 280/728.3 |
| 2004/0195814 | A1* | 10/2004 | Muller et al. | 280/743.1 |
| 2005/0104346 | A1* | 5/2005 | Suwama et al. | 280/732 |
| 2009/0146402 | A1* | 6/2009 | Chen et al. | 280/728.3 |
| 2011/0062687 | A1* | 3/2011 | Matsuda et al. | 280/728.3 |

FOREIGN PATENT DOCUMENTS

JP      A-2005-126038      5/2005

* cited by examiner

*Primary Examiner* — Joseph Rocca
(74) *Attorney, Agent, or Firm* — Posz Law Group, PLC

(57) ABSTRACT

An automobile airbag door is formed by a door base member, a door cover member, and a tear line. The door base member and the door cover member form a part of a base member and a part of a cover member of an instrument panel, respectively. When pressed by an airbag being deployed and inflated, the door base member is torn from the tear line. The first zone is defined as the bonded part between the outer surface of the door base member and the door cover member which extends along the tear line and includes a part on which the tear line is projected. The second zones are on both sides of the first zone and extend along the tear line. The automobile airbag door has a mechanism that makes the bond strength in the first zone weaker than the bond strength in each second zone.

8 Claims, 3 Drawing Sheets

AUTOMOBILE AIRBAG DOOR

BACKGROUND OF THE INVENTION

The present invention relates to an automobile airbag door that is formed by bonding a cover member onto a base member and constitutes a part of an automobile instrument panel.

A front passenger seat airbag apparatus has an airbag door. The airbag door is a part of an instrument panel, which is formed by bonding a cover member onto a base member. This type of airbag door has a door base member forming a part of the base member and a door cover member forming a part of the cover member. A tear line is formed in each of the door base member and the door cover member. When an automobile received an impact due to a front end collision, the front passenger seat airbag apparatus is activated. This deploys and inflates the airbag, so that the airbag applies pressing force to the airbag door. Accordingly, the door base member and the door cover member are torn along the tear line to open the airbag door. The airbag passes through the open airbag door and is deployed and inflated between the instrument panel and an occupant seated in the front passenger seat. The deployed and inflated airbag reduces the impact applied to the occupant.

In recent years, there has been a demand for improvement of the appearance of interior parts, in addition to a demand for reduction of the number of manufacturing steps and the costs for forming tear lines. In this respect, it has been proposed to eliminate the tear line from door cover members. Even in this case, the door cover member needs to be torn together with the door base member when the airbag is deployed and inflated.

To meet such a need, Japanese Laid-Open Patent Publication No. 2005-126038 discloses an automobile airbag door in which the bond strength of a door base member and a door cover member is set to such a value that when the door base member is torn, the door cover member does not peel off the door base member. That is, when the door base member is torn along the tear line by being pressed by the airbag, the door cover member is easily torn because the door cover member is hard to peel off the door base member. However, no consideration is given to the possibility of allowing the door cover member to be torn along the tear line of the door base member.

SUMMARY OF THE INVENTION

Accordingly, it is an objective of the present invention to provide an automobile airbag door that allows a door cover member having no tear line to be torn along a tear line of a door base member.

To achieve the foregoing objective and in accordance with one aspect of the present invention, an automobile airbag door is provided that forms a part of an automobile instrument panel, which is formed by bonding a cover member onto an outer surface of a base member. The airbag door includes a door base member, a door cover member, a tear line, and a bond strength difference generating mechanism. The door base member forms a part of the base member. The door cover member forms a part of the cover member. The tear line is formed only in the door base member. When the door base member is pressed by an airbag being deployed and inflated, the tear line functions as a starting point of tearing action of the door base member. In a bonded part between the outer surface of the door base member and the door cover member, a band-like zone, which extends along the tear line and includes a part on which the tear line is projected, is defined as a first zone, and a band-like zone, which is on either side of the first zone and extends along the tear line, is defined as a second zone. The bond strength between the door base member and the door cover member in the first zone is weaker than that in the second zone.

DETAILED DESCRIPTION OF THE PREFERRED EMBODIMENTS

First Embodiment

A first embodiment of the present invention will now be described with reference to FIGS. 1 to 3. In the description of an automobile airbag door of the present invention, the side of a base member 13 that is closer to the front passenger seat (the upper side as viewed in FIG. 1) is referred to as an outer side, and the side farther from the front passenger seat (the lower side as viewed in FIG. 1) will be referred to as an inner side.

An instrument panel is arranged in front of the driver's seat and the front passenger seat of an automobile.

Figure 1:
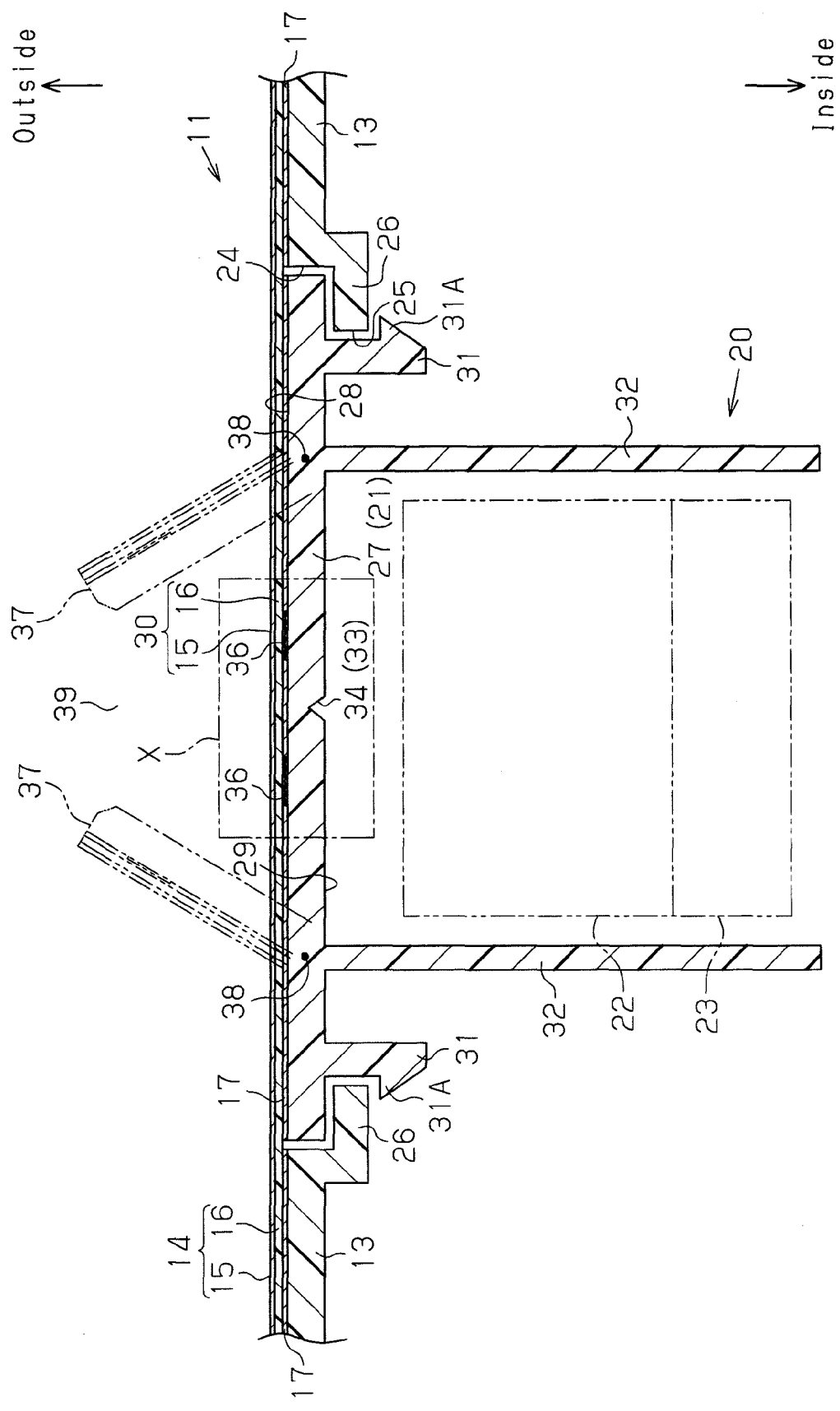
FIG. 1 is a partial cross-sectional view illustrating a part of an instrument panel having an automobile airbag door according to a first embodiment of the present invention.

As shown in FIG. 1, the main part of an instrument panel 11 is formed by a base member 13, which is a core member. Parts of the base member 13 except for a door base member 27 of an automobile airbag door 21, which will be discussed below, are formed of a hard synthetic resin such as polypropylene (PP) by injection molding. A cover member 14 is laminated onto the outer surface of the base member 13.

The cover member 14 has a two-layer structure with a cover main body 15 and a foam layer 16. The cover main body 15 is formed of thermoplastic elastomer (TPO). The foam layer 16 is formed of urethane. The foam layer 16 is welded and laminated onto the inner surface of the cover main body 15. The inner surface of the foam layer 16 is bonded to the base member 13 with, for example, an olefin-based adhesive. That is, the cover member 14 is laminated onto the base member 13 with an adhesive layer 17 in between.

The automobile has a passenger seat airbag apparatus 20. When an impact is applied to the automobile from the front, the passenger seat airbag apparatus 20 deploys and inflates an airbag 22 in front of the front passenger seat to protect the occupant from the impact. The passenger seat airbag apparatus 20 includes the automobile airbag door 21, the airbag 22, and an inflator 23, which is an inflation gas supplying device. The automobile airbag door 21 forms a part of the instrument panel 11. The airbag 22 is installed in a state where it is folded inward in relation to the automobile airbag door 21. The inflator 23 is located inward of the airbag 22. When an impact is applied to the automobile from the front, the inflator 23 supplies inflation gas into the airbag 22. When supplied with inflation gas, the airbag 22 is deployed and inflated outward while being unfolded.

The basic structure of the automobile airbag door 21 will now be described.

An opening is formed in a part of the base member 13. The interior of the instrument panel 11 communicates with the exterior through the opening. The opening is formed by an outer opening 24 and an inner opening 25, which has a smaller opening area than the outer opening 24. The inner opening 25 is arranged inward of the outer opening 24. Engaging portions 26 extending toward the airbag 22 are provided at the boundary between the outer opening 24 and the inner opening 25.

The automobile airbag door 21 is formed by the door base member 27 and a door cover member 30. The door base member 27 forms a part of the base member 13 and has a sufficient size to close the outer opening 24. The door cover member 30 forms a part of the cover member 14, and laminated onto the outer surface of the door base member 27. Protrusions 31 protrude from an inner surface 29 of the door base member 27. In a state where the door base member 27 closes the outer opening 24, the protrusions 31 extend through the inner opening 25. An engaging claw 31A is provided in the distal end of each protrusion 31. The engaging portions 26 are held between the engaging claws 31A, which are hooked to the engaging portions 26, and the door base member 27. The door base member 27 is formed, for example, of thermoplastic elastomer (TPO). TPO is softer than a hard synthetic resin material (PP). That is, TPO is material that is unlikely to be shattered by the pressing force of the airbag 22 being deployed and inflated. The door cover member 30 has a laminated two-layer structure with the cover main body 15 and the foam layer 16. That is, the door cover member 30 has the same structure as the cover member 14.

Retainers 32 extend inward from the inner surface 29 of the door base member 27. The retainers 32 are closer to the airbag 22 than the protrusions 31. The retainers 32 hold the airbag 22 and the inflator 23.

Figure 2:
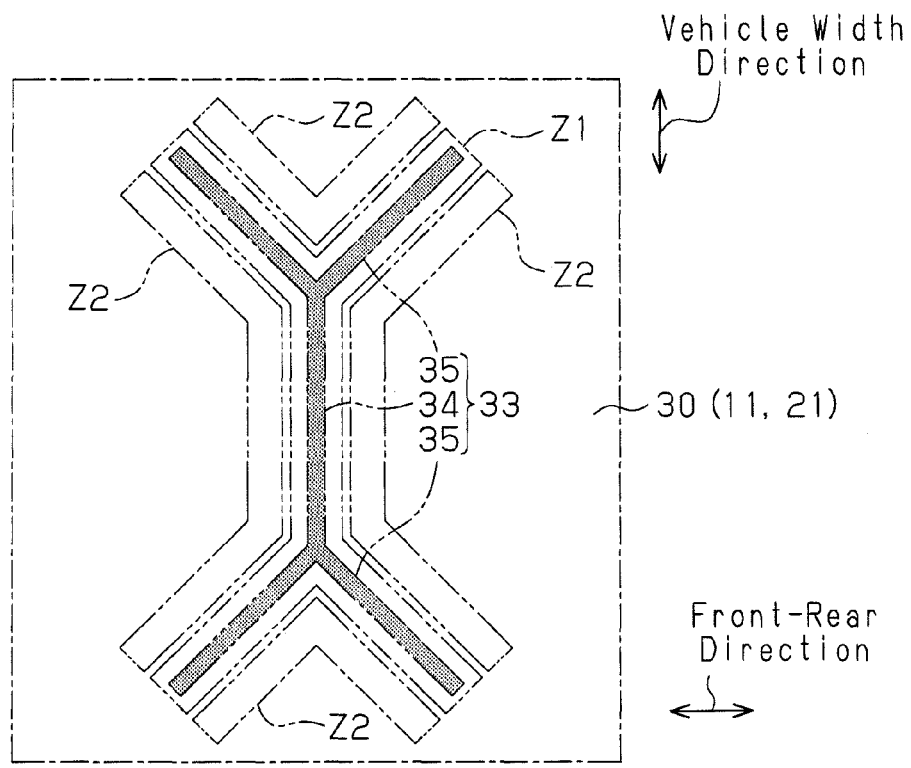
FIG. 2 is an enlarged partial plan view illustrating an area including a tear line, a first zone, and second zones of an automobile airbag door.

As shown in FIGS. 1 and 2, a tear line 33 is formed on the inner surface 29 of the door base member 27. When pressed by the airbag 22 being deployed and inflated, the door base member 27 is torn from the tear line 33 as a starting point. The tear line 33 has a double Y-structure, which is openable in four directions. The tear line 33 includes a center section 34 and a pair of V sections 35. The center section 34 extends straight along the vehicle widthwise direction. Each V section 35 extends from an end of the center section 34 as a starting point along the vehicle widthwise direction and spreads wider toward the outside of the vehicle.

Figure 3:
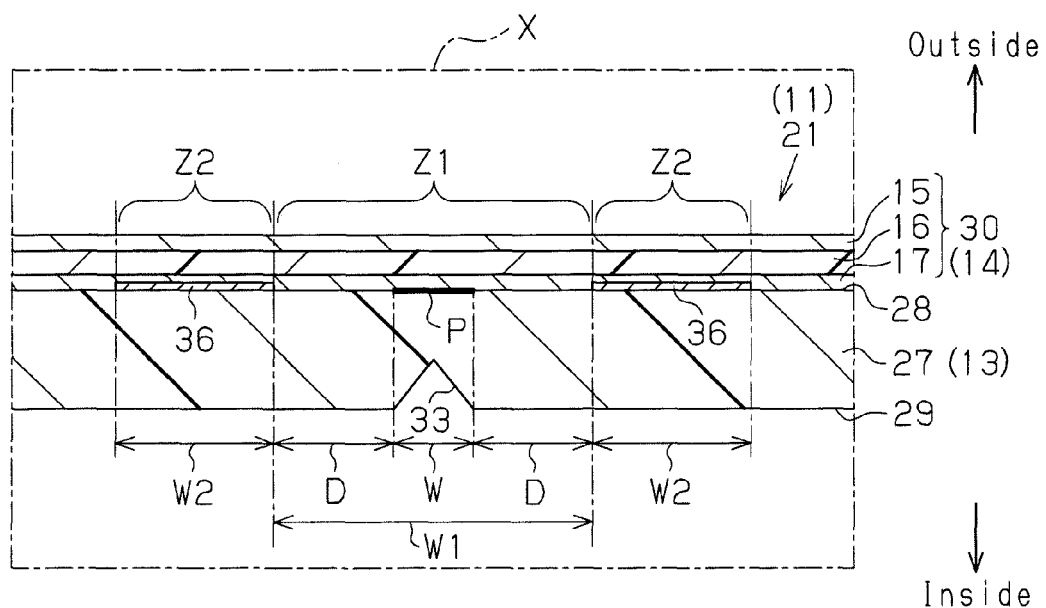
FIG. 3 is an enlarged partial cross-sectional view illustrating section X in FIG. 1.

As shown in FIG. 3, the tear line 33 has a V-shaped cross section. At the tear line 33, the thickness of the door base member 27 is less than that of the remainder of the door base member 27. The width W of the tear line 33 along the front-rear direction is 3 mm. In order to improve the appearance of the interior parts, in addition to reduce the number of manufacturing steps and the costs for forming tear lines, the door cover member 30 is formed to have no tear line. In addition to the basic structure described above, the automobile airbag door 21 has bond strength difference generating mechanism.

The bond strength difference generating mechanism will now be described with reference to FIGS. 2 and 3.

As shown in FIGS. 2 and 3, in a bonded part between an outer surface 28 of the door base member 27 and the door cover member 30, a band-like zone that extends along the tear line 33 and includes a part P on which the tear line 33 is projected (the thick solid line in FIG. 3) is defined as a first zone Z1. When a position that is separated from the outer edge of the tear line 33 in the widthwise direction by a predetermined distance D matches with the outer edge of the first zone Z1, the width W1 of the first zone Z1 is represented by the following expression (1).

$$W1 = W + 2 \cdot D \tag{1}$$

The distance D is preferably set in a range between 10 mm and 40 mm. In this embodiment, the distance D is set to 10 mm.

In the outer surface 28 of the door base member 27, band-like zones that are on both sides of the first zone Z1 and extend along the tear line 33 are defined as second zones Z2. The width W2 of each second zone Z2 is preferably set in a range between 10 mm to 40 mm, and more preferably in a range between 10 mm and 20 mm. In this embodiment, the width W2 is set to 10 mm.

The bond strength difference generating mechanism is realized by making the bond strength of the door cover member 30 to the door base member 27 in the first zone Z1 weaker than the bond strength in each second zone Z2. The bond strength difference generating mechanism is formed by a primer layer 36 that is applied to each second zone Z2 and formed between the adhesive layer 17 and the door base member 27. Each primer layer 36 improves the adhesion between the outer surface 28 of the door base member 27 and the adhesive layer 17. Each primer layer 36 is formed by applying to the door base member 27 a low-viscosity liquid containing a small quantity of nonvolatile material as a primer. After the thus applied low-viscosity liquid sufficiently dries, the adhesive layer 17 is formed by applying an adhesive to the dried low-viscosity liquid. The type of the primer is varied in accordance with the material used for the door base member 27. In this embodiment, chlorinated polyolefin (CPO) is used as the primer.

Operation of the automobile airbag door 21 will now be described.

Unless an impact is applied to the automobile from front, the inflator 23 of the passenger seat airbag apparatus 20 does not discharge inflation gas. That is, receiving no inflation gas, the airbag 22 remains folded. In the automobile airbag door 21, the door cover member 30 is bonded to the outer surface 28 of the door base member 27 via the adhesive layer 17. In the first zone Z1, where no primer layer 36 is provided, the bond strength between the door base member 27 and the door cover member 30 is weaker than that of the door cover member 30 in the second zones Z2, which have the primer layer 36.

When an impact is applied to the automobile due to a frontal collision, the inflator 23 discharges inflation gas, which is then supplied to the airbag 22. When supplied with inflation gas, the airbag 22 is deployed and inflated while being unfolded. During such deployment and inflation, the pressing force of the airbag 22 is applied to both of the door base member 27 and the door cover member 30, which form the automobile airbag door 21. As a result, the door base member 27 and the door cover member 30 are torn. At the tear line 33, the thickness and the strength of the door base member 27 are less than that of the remainder of the door base member 27. Therefore, the pressing force of the airbag 22 tears the door base member 27 from and along the tear line 33 as a starting point.

Assume that the bond strength between the door base member 27 and the door cover member 30 is the same between the first zone Z1 and the second zones Z2, that is, assume that the zones Z1, Z2 have no or little difference in the bond strength. In this case, the door cover member 30 as a whole, which has no tear line, receives the pressing force of the airbag 22. This stretches the whole door cover member 30, making it difficult to tear the door cover member 30.

In contrast, according to the first embodiment, a primer layer 36 is formed in each second zone Z2. On the other hand, no primer layer 36 is formed in the first zone Z1. Therefore, in the first zone Z1, the bond strength between the door base member 27 and the door cover member 30 is weaker than the bond strength in each second zone Z2. That is, in each second zone Z2, the bond strength between the door base member 27 and the door cover member 30 is relatively great, so that the door cover member 30 is immovable or hard to move relative to the door base member 27. Thus, in each second zone Z2, the door cover member 30 is hard to expand and hard to be torn.

The door cover member 30 receives the pressing force of the airbag 22 mainly in the first zone Z1. That is, the pressing force of the airbag 22 concentrates on the first zone Z1, which is bonded to the door base member 27 by a bond strength weaker than in the second zones Z2. As a result, the door cover member 30 is torn at sections corresponding to the tear line 33 in the first zone Z1, that is, along the tear line 33 of the door base member 27.

When the door base member 27 and the door cover member 30 are torn along the double-Y shaped tear line 33 as indicated by chain double-dashed lines in FIG. 1, a pair of door portions 37 are formed in the automobile airbag door 21. At the same time, the door portions 37 open outward about hinge portions 38 at the proximal ends. This creates an opening 39 in the automobile airbag door 21. The airbag 22 passes through the opening 39 and is deployed and inflated between the instrument panel 11 and an occupant seated in the front passenger seat. The deployed and inflated airbag 22 reduces the impact applied to the occupant due to the frontal collision.

The first embodiment has the following advantages.

(1) In the bonded part between the outer surface 28 of the door base member 27 and the door cover member 30, a band-like zone that extends along the tear line 33 and includes a part P on which the tear line 33 is projected is defined as the first zone Z1. Band-like zones that are on both sides of the first zone Z1 and extend along the tear line 33 are defined as the second zones Z2. The bond strength difference generating mechanism is realized by making the bond strength of the door cover member 30 to the door base member 27 in the first zone Z1 weaker than the bond strength in each second zone Z2. Therefore, the pressing force of the airbag 22 being deployed and inflated concentrates on the first zone Z1, the bond strength of which is weaker than that of the second zones Z2. Thus, the door cover member 30, which has no tear line, can be torn along the tear line 33 of the door base member 27.

(2) The bond strength difference generating mechanism is formed by a primer layer 36 that is applied to each second zone Z2 and formed between the adhesive layer 17 and the door base member 27. Therefore, in the second zones Z2, which have the primer layers 36, the bond strength of the adhesive layer 17 to the door base member 27 is higher than that in the first zone Z1, which has no primer layer 36. The same advantage as the above item (1) is thus achieved.

(3) In a case where the bond strength is differentiated between the first zone Z1 and the second zones Z2 in an area about the second zone Z2, the same advantage as the above item (1) is achieved. This advantage is achieved by making the bond strength of the first zone Z1 to be torn weaker than the bond strength of areas around the first zone Z1 in the door cover member 30. In this regard, the bond strength difference generating mechanism is provided only in the second zone Z2 in the first embodiment. In this case, the area of the primer layer 36, which is the bond strength difference generating mechanism, is minimized. The amount of work and material for forming the bond strength difference generating mechanism can be minimized.

Second Embodiment

A second embodiment of the present invention will now be described with reference to FIG. 4. In the second embodiment, like or the same reference numerals are given to those components that are like or the same as the corresponding components of the first embodiment and detailed explanations are omitted.

Figure 4:
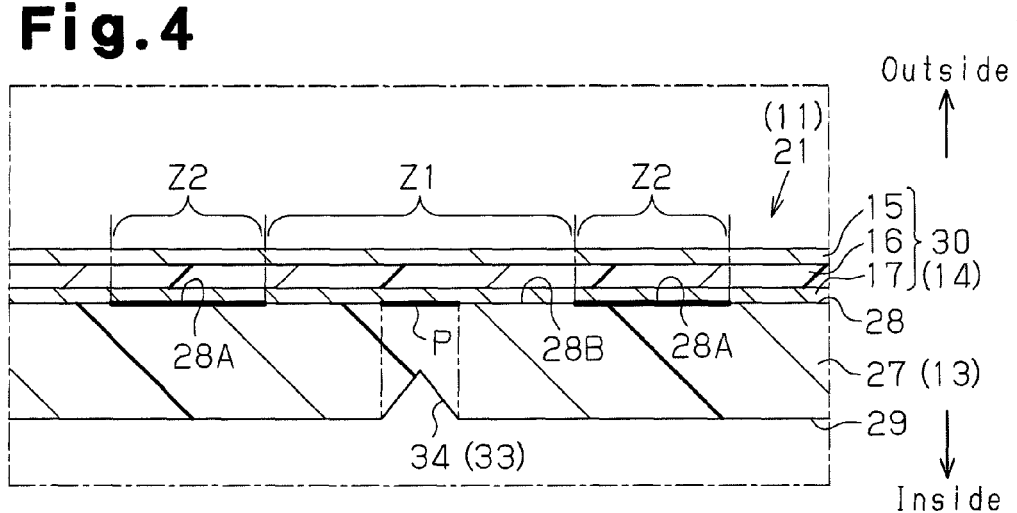
FIG. 4 is an enlarged cross-sectional view illustrating a part of an automobile airbag door according to a second embodiment of the present invention.

As indicated by thick solid lines in FIG. 4, the bond strength difference generating mechanism is formed by rough surfaces 28A. The rough surfaces 28A are formed in the second zones Z2 on the outer surface 28 of the door base member 27. The rough surfaces 28A are formed to be rougher than the first zone Z1. The rough surfaces 28A are formed by exposing the second zones Z2 of the outer surface 28 after resin molding of the door base member 27 and before the adhesive layer 17 is formed. Since the first zone Z1 of the outer surface 28 is not exposed to flame, the first zone Z1 is formed as a smooth surface 28B.

On the outer surface 28 of the door base member 27, a rough surface 28A, which is rougher than the first zone Z1, is formed on each second zone Z2. This increases the cohesive force between the adhesive layer 17 and the rough surfaces 28A and bonded area between the adhesive layer 17 and the rough surfaces 28A. Thus, in each second zone Z2, the bond strength between the adhesive layer 17 and the door base member 27 is higher than that in the first zone Z1.

Thus, in addition to the advantages of the above items (1) and (3), the second embodiment achieves the following advantage instead of the advantage of the item (2).

(4) On the outer surface 28 of the door base member 27, a rough surface 28A, which is rougher than the first zone Z1, is formed on each second zone Z2 as the bond strength difference generating mechanism. This makes the bond strength between the adhesive layer 17 and the door base member 27 in each second zone Z2 higher than that in the first zone Z1. The same advantage as the above item (1) is thus achieved.

(5) The rough surfaces 28A are formed by exposing the second zones Z2 on the outer surface 28 of the door base member 27 to flame. The rough surfaces 28A can be formed on parts of the outer surface 28 of the door base member 27 by such a simple method.

Third Embodiment

A third embodiment of the present invention will now be described with reference to FIG. 5. In the third embodiment, like or the same reference numerals are given to those components that are like or the same as the corresponding components of the first embodiment and detailed explanations are omitted.

Figure 5:
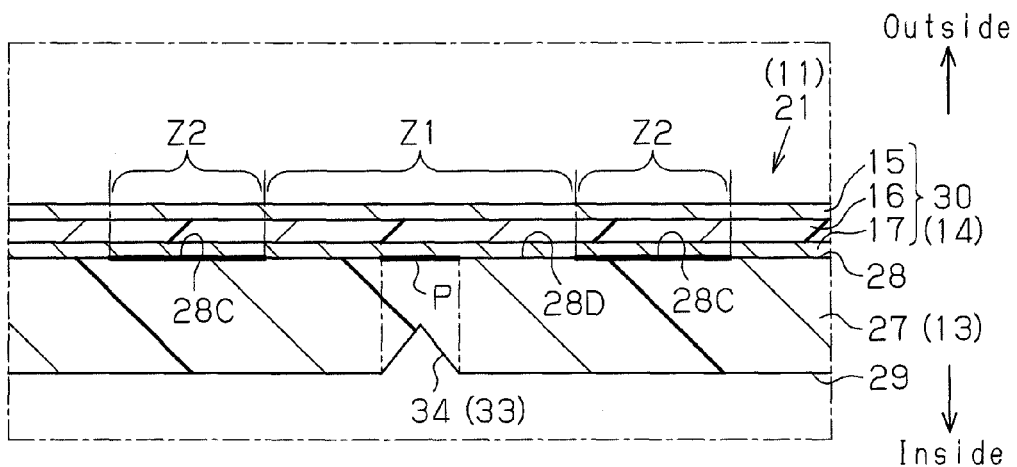
FIG. 5 is an enlarged cross-sectional view illustrating a part of an automobile airbag door according to a third embodiment of the present invention.

As indicated by thick solid lines in FIG. 5, the bond strength difference generating mechanism is formed by heated surfaces 28C. The heated surfaces 28C are formed in the second zones Z2 on the outer surface 28 of the door base member 27. The heated surface 28C are formed by heating before the door cover member 30 is bonded to the door base member 27. In contrast, the first zone Z1 in the outer surface 28 of the door base member 27 is a non-heated surface 28D. The door cover member 30 is bonded to the door base member 27 via the non-heated surface 28D of the first zone Z1, and bonded to the door base member 27 via the heated surfaces 28C of the second zones Z2.

Before the door cover member 30 is bonded to the door base member 27, the temperature of the outer surface 28 of the door base member 27 is higher in the heated surface 28C than in the non-heated surface 28D. Therefore, by causing the door cover member 30 and the door base member 27 to closely contact each other via the heated surfaces 28C, the bond strength between the adhesive layer 17 and the door base member 27 are higher in the second zones Z2 than in the first zone Z1.

Thus, in addition to the advantages of the above items (1) and (3), the third embodiment achieves the following advantage instead of the advantage of the item (2).

(6) The heated surface 28C are formed by heating before the door cover member 30 is bonded to the door base member 27. The heated surfaces 28C are formed in the second zones Z2 on the outer surface 28 of the door base member 27. The bond strength difference generating mechanism is formed by the heated surfaces 28C. Thus, in each second zone Z2, the bond strength between the adhesive layer 17 and the door base member 27 is higher than that in the first zone Z1, so that the advantage of the item (1) is achieved.

Fourth Embodiment

A fourth embodiment of the present invention will now be described with reference to FIG. 6. In the fourth embodiment, like or the same reference numerals are given to those components that are like or the same as the corresponding components of the first embodiment and detailed explanations are omitted.

Figure 6:
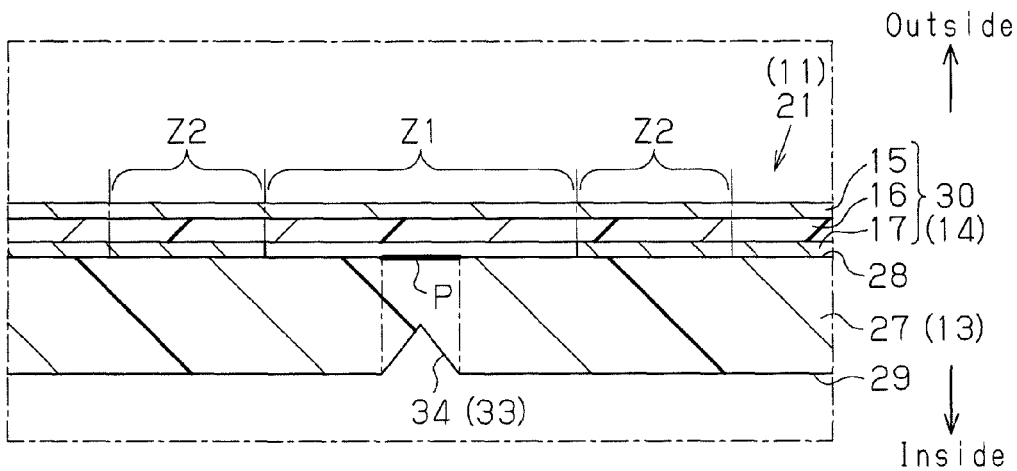
FIG. 6 is an enlarged cross-sectional view illustrating a part of an automobile airbag door according to a fourth embodiment of the present invention.

As shown in FIG. 6, the door cover member 30 is not bonded to the door base member 27 in the first zone Z1. That is, in the first zone Z1, no adhesive layer 17 is provided between the outer surface 28 of the door base member 27 and the door cover member 30. The door cover member 30 is boded to the door base member 27 in the entire area except for the first zone Z1. In this manner, the bond strength difference generating mechanism is formed by making the bond strength in the first zone Z1 weaker than that in the second zones Z2. According to the fourth embodiment, the door cover member 30 is not bonded to the door base member 27 in the first zone Z1. Therefore, in the first zone Z1, the bond strength between the door base member 27 and the door cover member 30 is weaker than the bond strength in each second zone Z2, where the door base member 27 is bonded to the door cover member 30.

Thus, in addition to the advantages of the above items (1) and (3), the third embodiment achieves the following advantage instead of the advantage of the item (2).

(7) In each second zone Z2, the door cover member 30 is bonded to the door base member 27. In the first zone Z1, the door cover member 30 is not bonded the door base member 27. The thus configured bond strength difference generating mechanism makes the bond strength between the door base member 27 and the door cover member 30 in the first zone Z1 weaker than that in the second zones Z2, so that the advantage of the item (1) is achieved.

The present invention may be embodied in the following forms.

In the base member 13, parts other than the door base member 27 may be formed of a material other than polypropylene (PP). For example, the parts other than the door base member 27 may be formed of polycarbonate (PC)/acrylonitrile butadiene styrene (ABS), or glass reinforced acrylonitrile-styrene (ASG).

The tear line 33 may be formed by alternately arranging thin portions forming recesses and thick portions without recesses. Alternatively, the tear line 33 may be formed by one continuous recess. In these cases, the recesses include thin portions and thus reduce the tear strength. In the former case, since discontinuous thick portions remain, the rigidity of the tear line 33 is maintained. Therefore, even if an occupant places a hand on the instrument panel 11 and places his/her weight on it, the tear line 33 is not easily deformed.

The tear line 33 may be formed in the outer surface 28 as well as in the inner surface 29 of the door base member 27. Also, the tear line 33 may be formed only in the outer surface 28.

The shape of the tear line 33 may be changed from the V shape to an H shape.

The cover main body 15 may be formed of a material other than thermoplastic elastomer (TPO), for example, polyvinyl chloride (PVC).

The foam layer 16 may be formed of a material other than urethane, for example, foaming PVC.

The cover main body 15 may contain fibrous reinforcing material such as talc or glass fiber. In this case, the rigidity of the cover main body 15 is increased, so that the cover main body 15 is hard to extend, while being easy to tear.

The foam layer 16 may be omitted from the cover member 14 and the door cover member 30. That is, the cover member 14 and the door cover member 30 may have a single-layer structure only with the cover main body 15.

In the second embodiment, instead of being exposed to flame, the second zones Z2 of the outer surface 28 of the door base member 27 may be subjected to grain finish. In this case, the grain finish can be performed when forming the door base member 27 by molding resin. Therefore, the rough surfaces 28A can be formed on the second zone Z2 without performing any process after the resin molding. Alternatively, the rough surfaces 28A may be formed by using polishing paper, abrasive cloth, a wire brush, a sander, a sand blasting device, or a chemical substance. This makes the bond strength between the adhesive layer 17 and the door base member 27 in each second zone Z2 higher than that in the first zone Z1.

In the third embodiment, the bond strength difference generating mechanism may be formed by, before the door cover member 30 is bonded to the door base member 27, cooling the first zone Z1 in the outer surface 28 of the door base member 27 and not cooling the second zones Z2 in the outer surface 28 of the door base member 27.

In the first to third embodiments, the bond strength difference generating mechanism may be provided about the second zones Z2.

The bond strength difference generating mechanism according to the first to fourth embodiments may be combined as necessary to create new bond strength difference generating mechanism.

The invention claimed is:

1. An automobile airbag door that forms a part of an automobile instrument panel, which is formed by bonding a cover member onto an outer surface of a base member, the airbag door comprising:
   a door base member that forms a part of the base member;
   a door cover member that forms a part of the cover member;
   a tear line formed only in the door base member, wherein, when the door base member is pressed by an airbag being deployed and inflated, the tear line functions as a starting point of tearing action of the door base member; and a bond strength difference generating mechanism, wherein, in a bonded part between the outer surface of the door base member and the door cover member, a band-like zone, which extends along the tear line and includes a part on which the tear line is projected, is defined as a first zone, and a band-like zone, which is on either side of the first zone and extends along the tear line, is defined as a second zone, and wherein the bond strength between the door base member and the door cover member in the first zone is weaker than that in the second zone.

2. The automobile airbag door according to claim 1, wherein the door cover member is bonded to the door base member via an adhesive layer, and the bond strength difference generating mechanism is formed by a primer layer that is formed between the adhesive layer and the door base member in the second zone.

3. The automobile airbag door according to claim 1, wherein the bond strength difference generating mechanism is formed by a rough surface formed in the second zone in the outer surface of the door base member, the rough surface being rougher than the first zone.

4. The automobile airbag door according to claim 3, wherein the rough surface is formed by exposing the second zone in the outer surface of the door base member to flame.

5. The automobile airbag door according to claim 3, wherein the rough surface is formed by subjecting the second zone in the outer surface of the door base member to grain finish.

6. The automobile airbag door according to claim 1, wherein the bond strength difference generating mechanism is a heated surface that is formed by heating the second zone in the outer surface of the door base member before the door cover member is bonded to the door base member, and before the door cover member is bonded to the door base member, the temperature of the second zone is higher than the temperature of the first zone.

7. The automobile airbag door according to claim 1, wherein the bond strength difference generating mechanism is provided only in the second zone.

8. The automobile airbag door according to claim 1, wherein in the second zone, the door cover member is bonded to the door base member, and the bond strength difference generating mechanism makes the bond strength between the door base member and the door cover member in the first zone weaker than that in the second zone by not bonding the door cover member to the door base member in the first zone.

\* \* \* \* \*